United States Patent
Fukushima et al.

(10) Patent No.: US 8,297,516 B2
(45) Date of Patent: Oct. 30, 2012

(54) COIL ANTENNA AND NON-CONTACT INFORMATION MEDIUM

(75) Inventors: Kiyotaka Fukushima, Kanagawa (JP); Kenji Yamamotoya, Kanagawa (JP); Masayuki Miura, Kanagawa (JP); Kenichiro Tami, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 12/734,019

(22) PCT Filed: Nov. 18, 2008

(86) PCT No.: PCT/JP2008/070935
§ 371 (c)(1),
(2), (4) Date: Apr. 5, 2010

(87) PCT Pub. No.: WO2009/075169
PCT Pub. Date: Jun. 18, 2009

(65) Prior Publication Data
US 2010/0230501 A1    Sep. 16, 2010

(30) Foreign Application Priority Data
Dec. 12, 2007  (JP) ................................. 2007-321267

(51) Int. Cl.
*G06K 19/05* (2006.01)
(52) U.S. Cl. ........................................ 235/492; 235/487
(58) Field of Classification Search .................. 235/487, 235/492, 493
See application file for complete search history.

(56) References Cited

U.S. PATENT DOCUMENTS

| | | | | |
|---|---|---|---|---|
| 5,424,527 A * | 6/1995 | Takahira | | 235/492 |
| 6,161,761 A | 12/2000 | Ghaem et al. | | |
| 6,600,219 B2 * | 7/2003 | Higuchi | | 257/679 |
| 6,631,847 B1 * | 10/2003 | Kasahara et al. | | 235/487 |
| 7,333,786 B2 | 2/2008 | Kikuchi et al. | | |
| 2004/0074975 A1 | 4/2004 | Gundlach et al. | | |
| 2006/0071084 A1 * | 4/2006 | Detig et al. | | 235/492 |
| 2007/0063803 A1 * | 3/2007 | Yamashita et al. | | 336/83 |
| 2007/0158438 A1 | 7/2007 | Fukuda et al. | | |
| 2009/0040734 A1 * | 2/2009 | Ochi et al. | | 361/737 |

FOREIGN PATENT DOCUMENTS

| | | |
|---|---|---|
| CN | 1474996 A | 2/2004 |
| CN | 1604117 A | 4/2005 |

(Continued)

OTHER PUBLICATIONS

International Search Report and Written Opinion dated Dec. 22, 2008 issued in International Application No. PCT/JP2008/070935.

(Continued)

*Primary Examiner* — Daniel StCyr
(74) *Attorney, Agent, or Firm* — Edwards Wildman Palmer LLP

(57) ABSTRACT

Without using a component such as a chip coil, a winding pattern is formed with a wire with which a main wiring pattern is formed. This enables to deal with the flexibility by realizing a thin product using a coil antenna. Further, the wiring pattern is designed such that the winding pattern is provided and distributed to the main wiring pattern forming a loop, and is formed with the wire so as to have a wound shape small enough compared with the main wiring pattern. In this way, the ratio of the self-inductance to the mutual inductance is appropriately made further large, so that the mutual inductance is made comparatively small.

19 Claims, 12 Drawing Sheets

FOREIGN PATENT DOCUMENTS

| | | |
|---|---|---|
| JP | 2001-034725 | 2/2001 |
| JP | 2002-290136 | 10/2002 |
| JP | 2003-085519 A | 3/2003 |
| JP | 2004-513464 | 4/2004 |
| JP | 2006-067479 | 3/2006 |
| JP | 2007-166379 | 6/2007 |
| WO | WO-02/39379 A1 | 5/2002 |

OTHER PUBLICATIONS

Office Action issued Jul. 17, 2012 for corresponding Japanese Patent Application No. 2007-321267 with English translation.

Office Action mailed Sep. 4, 2012, issued for the corresponding Chinese Patent Application No. 200880108655.3 and English translation thereof.

* cited by examiner

- WIRE 46
- 42 MAIN WIRING PATTERN
- 40 COIL ANTENNA
- 48 CONNECTION SECTION
- 44 WINDING PATTERN

- WIRE 16
- 50 COIL ANTENNA
- 12 MAIN WIRING PATTERN
- 14 WINDING PATTERN
- 18 CONNECTION SECTION
- 52 SHIELDING OBJECT

COIL ANTENNA AND NON-CONTACT INFORMATION MEDIUM

TECHNICAL FIELD

The present invention relates to a coil antenna, and a non-contact information medium using the coil antenna.

BACKGROUND ART

Coil antennas used to provide and receive information using electromagnetic induction is constituted by a resonant circuit, and a resonant frequency is generally adjusted (tuned) to efficiently provide and receive information. Important parameters for determining a resonant frequency of a resonant circuit include self-inductance and capacitance of the resonant circuit. The resonant frequency is generally adjusted by changing values of these self-inductance and capacitance.

When a plurality of electrical circuits with self-inductance is placed close to each other, mutual inductance occurs. This mutual inductance is also an important parameter for efficiently providing and receiving information. In general, the mutual inductance is designed to have a value as large as possible in an assumed use environment, aiming to achieve strong communication coupling between the antennas at the transmitting and the receiving ends.

One application using a coil antenna is a non-contact information medium. A non-contact information medium has no contact with a reader/writer and therefore causes no contact failure, thus being available at a position away from the reader/writer. Non-contact approaches have been in increasing demands due to their features such as being resistant to stain, rain, and static electricity and their high security level.

A non-contact information medium gains operating power by electromagnetic induction, using an electric wave received from a reader/writer, and exchanges information with the reader/writer using an electric wave of a certain frequency. To this end, each of the non-contact information medium and the reader/writer has a built-in coil antenna for transmitting and receiving an electric wave of a certain frequency.

A conventional non-contact information medium basically includes: a coil forming an antenna section that receives electric power from the outside, and transmits and receives information; a capacitor forming a resonant circuit with this coil; and an integrated circuit (IC) chip that controls processing operation to be performed by the non-contact information medium. To operate such a non-contact information medium, the non-contact information medium is placed within a communication range near the reader/writer. This causes mutual interaction between the resonant circuit of the non-contact information medium and a resonant circuit of the reader/writer, thus producing induced current in the coil constituting the antenna section of the non-contact information medium. Using this induced current as operating power, the IC chip operates to transmit information to the reader/writer through the coil constituting the antenna section. In this way, by performing wireless communication, the non-contact information medium and the reader/writer transmit and receive information (see, for example, Patent Document 1).

When a plurality of non-contact information media is placed near a reader/writer, however, mutual interaction occurs not only between the non-contact information media and the reader/writer but also between the non-contact information media. In this case, the use environment is different from a use environment assumed when designed. This results in a change in resonant frequency of the non-contact information media, and reduces the effect of the mutual interaction with the reader/writer, often failing to perform communication.

As a countermeasure for such problems, in Patent Document 2, a chip coil (a lumped constant inductor) is provided in a portion of each coil of non-contact information media. Further, the mutual interaction between the non-contact information media is reduced, while the frequency of an electric wave used for communication is matched to the resonant frequency of the non-contact information media. In this way, the read performance is improved when a plurality of non-contact information media is placed near a reader/writer.

Patent Document 1: Japanese Patent Application Laid-open No. 2001-34725

Patent Document 2: Japanese Patent Application Laid-open No. 2006-67479

DISCLOSURE OF INVENTION

Problem to be Solved by the Invention

For a chip coil (lumped constant inductor) of each non-contact information medium described in Patent Document 2, it is necessary to use a chip with a large inductance to make the mutual inductance small. Such a chip has a relatively large figure with a large thickness. Thus, for commercializing non-contact information media of card type for example, the thickness of a chip coil or the like (about 0.5 millimeter currently) is a hamper though the thickness of an IC chip or the like has been relatively thinned (about 0.15 millimeter currently). This results in a hard card that inevitably has a large overall thickness to be finished as a flat product including the chip coil portion. Therefore, demands for flexibility and the like by realizing a thin figure have not been met.

Even in the non-contact information media described in Patent Document 2, just providing a small coil with a winding pattern to a portion of a coil, as shown in FIG. 12 of Patent Document 2, still allows a relatively large mutual inductance to be present between coil antennas built in the non-contact information media. Thus, the effect of their mutual interaction is relatively large. This is not a sufficient countermeasure for further improving the read performance when a plurality of non-contact information media is placed near a reader/writer.

The present invention is made in view of the foregoing, and has an object to provide: a coil antenna that is adaptable to a thin figure without using a component such as a chip coil, and that appropriately makes the ratio of self-inductance to mutual inductance further large, so as to achieve a comparatively small mutual inductance that results in small mutual interaction even when overlapped; and a non-contact information medium using the coil antenna.

Means for Solving Problem

A coil antenna according to an aspect of the present invention is formed with a wire arranged in a loop shape and forming a resonant circuit with a capacitor electrically connected thereto. The coil antenna includes a winding pattern that is distributed to a portion of or an entire main wiring pattern forming the loop, and that is formed with the wire to have a wound shape small enough compared with the main wiring pattern.

In the coil antenna, the wound shape of the winding pattern may be a spiral shape.

In the coil antenna, the winding pattern may be formed on same plane as the main wiring pattern so as to be distributed to a plurality of locations in the main wiring pattern.

In the coil antenna, the winding pattern may be formed continuously along the main wiring pattern so as to have the spiral shape having a turning direction opposite a turning direction of an adjoining spiral shape.

In the coil antenna, the winding pattern may be formed on a plane orthogonal to a plane on which the main wiring pattern is formed.

In the coil antenna, the winding pattern may be formed and distributed so as to traverse a portion of the main wiring pattern.

In the coil antenna, the winding pattern may be formed and distributed along at least a portion of the main wiring pattern.

In the coil antenna, the wound shape of the winding pattern may be a zigzag shape formed such that a winding shape thereof is distributed along at least a portion of the main wiring pattern and spread out on same plane as the main wiring pattern.

The coil antenna may include a shielding object provided to overlap on one surface or both surfaces near an area where the winding pattern is formed.

In the coil antenna, the shielding objects may be made of magnetic material.

In the coil antenna, the shielding objects may be made of electrically conductive material.

A coil antenna according to another aspect of the present invention is formed with a wire arranged in a loop shape and forming a resonant circuit with a capacitor electrically connected thereto. The coil antenna includes a winding pattern that is formed, in a portion of a main wiring pattern forming the loop, with the wire to have a wound shape small enough compared with the main wiring pattern; and a shielding object provided to overlap on one surface or both surfaces near an area where the winding pattern is formed.

In the coil antenna, the shielding objects may be made of magnetic material.

In the coil antenna, the shielding objects may be made of electrically conductive material.

A non-contact information medium according to still another aspect of the present invention includes the coil antenna according to the aspect of the present invention; a capacitor that is electrically connected to the coil antenna, and forms a resonant circuit with the coil antenna; and an IC circuit that is connected to the resonant circuit, and transmits and receives information to and from a reader/writer.

EFFECT OF THE INVENTION

According to a coil antenna of the present invention, without using a component such as a chip coil, a winding pattern(s) are formed with a wire with which a main wiring pattern is formed. This provides an advantage of dealing with the flexibility by realizing a thin product using the coil antenna. Further, the wiring pattern is designed such that the winding pattern(s) are provided and distributed to a portion of or the entire main wiring pattern forming a loop, and are formed with the wire to have a wound shape(s) small enough compared with the main wiring pattern. Thus, by efficiently and appropriately making the ratio of self-inductance to mutual inductance further large, the mutual inductance can be made comparatively small. This provides an advantage of making the effect of mutual interaction small even when coil antennas are overlapped.

According to a coil antenna of the present invention, without using a component such as a chip coil, a winding pattern(s) are formed in a portion of a main wiring pattern with a wire with which the main wiring pattern is formed. This provides an advantage of dealing with the flexibility by realizing a thin product using the coil antenna. Further, in a portion of the main wiring pattern forming a loop, a shielding object(s) are provided to overlap on one surface or both surfaces near an area of the winding patterns that are formed with the wire to have a wound shape(s) small enough compared with the main wiring pattern. Further, the ratio of self-inductance to mutual inductance is appropriately made further large. This provides an advantage of making the mutual inductance comparatively small.

A non-contact information medium of the present invention includes the above coil antenna, and the coil antenna itself can be made thin. This provides an advantage of realizing a thin figure of the non-contact information medium and meeting demands for flexibility and the like. Further, the mutual interaction between non-contact information media can be made small. This provides an advantage of significantly increasing the number of non-contact information media that can be placed simultaneously near a reader/writer.

Figure 1:
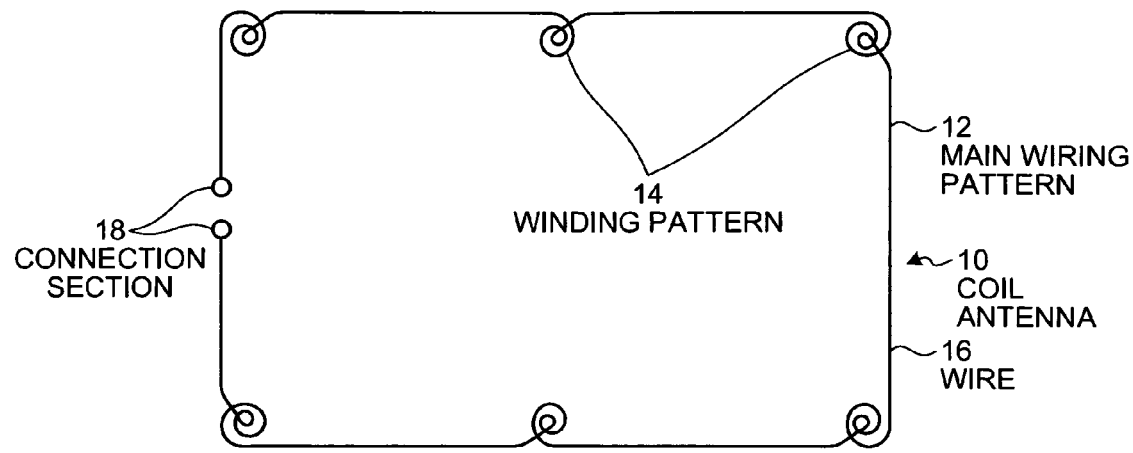
FIG. 1 is a schematic view of a coil antenna according to a first embodiment of the present invention.

EXPLANATIONS OF LETTERS OR NUMERALS 10, 10A, 10B coil antenna
12 main wiring pattern
14 winding pattern
16 wire
20 coil antenna
22 main wiring pattern
24 winding pattern
26 wire
30 coil antenna
32 main wiring pattern
34 winding pattern
36 wire
40 coil antenna
42 main wiring pattern
44 winding pattern
46 wire
50, 50A to 50E coil antenna
52 shielding object
60, 60A to 60E coil antenna
62 shielding object
70 coil antenna
71 shielding object
72 main wiring pattern
74 winding pattern
76 wire
80 coil antenna
81 shielding object
82 main wiring pattern
84 winding pattern
86 wire
90 non-contact information medium
91 capacitor
92 IC circuit

BEST MODE(S) FOR CARRYING OUT THE INVENTION

With reference to the accompanying drawings, a coil antenna and a non-contact information medium are described as best modes for carrying out the present invention. The present invention is not limited to the embodiments. In the drawings, the same portions are given the same reference numerals.

A coil antenna according to an embodiment is now described. A coil antenna according to the present embodiment includes: a main wiring pattern forming a loop; and a winding pattern(s), all formed with the same wire. The wiring pattern is designed such that the winding patterns are distributed to a portion of or the entire main wiring pattern forming a loop, and have a wound shape(s) small enough compared with the main wiring pattern. In this way, the coil antenna functions to relatively increase self-inductance and relatively reduce mutual inductance, so as to efficiently and appropriately make the ratio of the self-inductance to the mutual inductance further large.

First Embodiment

FIG. 1 is a schematic view of a coil antenna 10 according to a first embodiment. As shown in FIG. 1, the coil antenna 10 according to the first embodiment includes a main wiring pattern 12 and a plurality of winding patterns 14, all formed with the same wire 16. The main wiring pattern 12 is arranged in a rectangular loop shape of a predetermined size, and has connection sections 18 at both ends thereof respectively that are electrically connected to, for example, a capacitor (not shown) forming a resonant circuit. The loop shape of the main wiring pattern 12 is not limited to a rectangular shape and may be a suitable shape, for example, a round shape, depending on an object (the same applies to the following embodiments). For example, on the same plane on which the main wiring pattern 12 is arranged, the winding patterns 14 are formed to have spiral shapes distributed to six locations in the inner periphery of the main wiring pattern 12. The spiral wound shapes of the winding patterns 14 are formed to be small enough compared with the size of the main wiring pattern 12.

The self-inductance of the coil antenna 10 according to the first embodiment is a sum of a self-inductance of the main wiring pattern 12 and a self-inductance of the winding patterns 14. Thus, compared with a normal coil antenna including a main wiring pattern of the same shape and having equivalent self-inductance, the value of mutual inductance produced by placing coil antennas close to each other can be made sufficiently small, so that the effect of mutual interaction is significantly reduced. This is because the value of self-inductance the main wiring pattern 12 should have can be made small by a value accounting for the self-inductance of the winding patterns 14 and accordingly the mutual inductance due to the magnetic flux crossing the main wiring pattern 12 can be made small. Although the mutual inductance due to the magnetic flux crossing the winding patterns 14 is also produced, the produced mutual inductance is small. This is because the winding patterns 14 have small wound shapes and are distributed to a plurality of locations, making the self-inductance of each winding pattern 14 not so large. For example, compared with winding patterns intensively provided at one location, by providing and distributing the winding patterns 14 to a plurality of locations as in the first embodiment, the mutual inductance can be made further small as long as the self-inductance is equivalent. Further, the variation in resonant frequency caused by the mutual interaction can be reduced to half, for coil antennas placed close to each other.

With this arrangement, the coil antenna 10 can be provided that has a small mutual inductance compared with a normal coil antenna having equivalent self-inductance. Even when placed close to each other, such coil antennas 10 have small mutual interaction, and therefore can avoid a large variation in communication characteristics that is caused by placing a plurality of coil antennas close to each other. Specifically, the self-inductance for determining a resonant frequency is ensured, while the mutual inductance is made small, thus realizing stable communication resistant to environmental fluctuations even with interfering matters. Further, the winding patterns 14 are formed and distributed to a plurality of locations. This prevents that the thickness is increased locally as in chip coils.

In the first embodiment, the self-inductance and the mutual inductance of the coil antenna 10 are relative values. Thus, a coil antenna can be provided that has a large self-inductance value compared with a normal coil antenna having equivalent mutual inductance. According to the first embodiment, specifically, the coil antenna 10 can be provided that is arranged to have a sufficiently large ratio of the self-inductance to the mutual inductance, as desired.

[First Modification]

Figure 2:
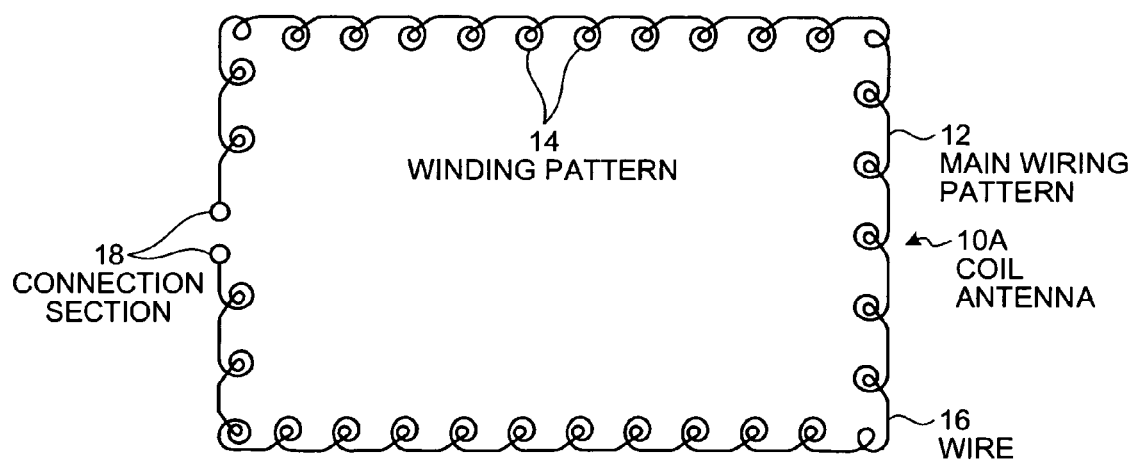
FIG. 2 is a schematic view of a coil antenna according to a first modification.

The number of winding patterns 14 formed and distributed is not limited to six and may be distributed, for example, to four locations at four corners of the main wiring pattern 12. Further, the winding patterns 14 may be formed and distributed continuously along the main wiring pattern 12. FIG. 2 is a schematic view of a coil antenna 10A according to a first modification. The coil antenna 10A according to the first modification includes many winding patterns 14 formed and distributed continuously along the entire inner periphery of the main wiring pattern 12. With this arrangement, the ratio of the self-inductance to the mutual inductance can be made further large in a thin form.

[Second Modification]

Figure 3:
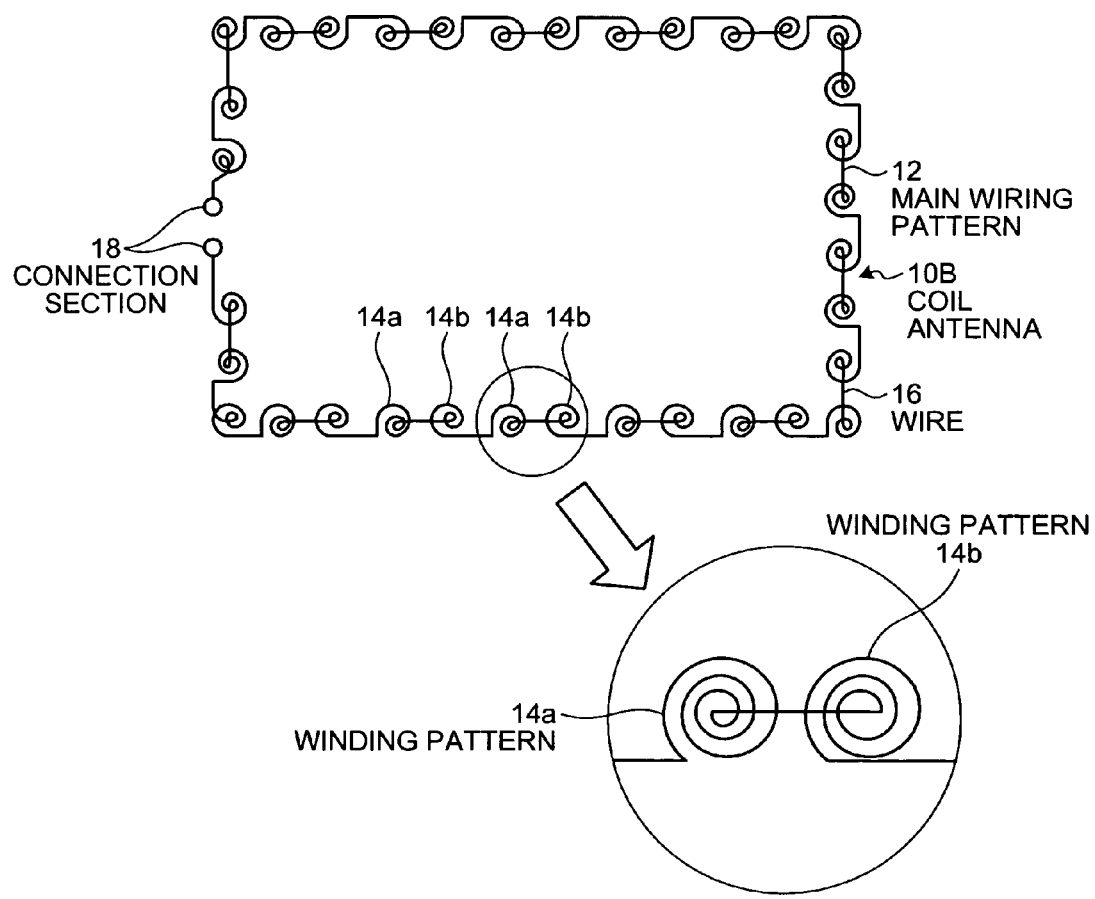
FIG. 3 is a schematic view of a coil antenna according to a second modification.

FIG. 3 is a schematic view of a coil antenna 10B according to a second modification. In the coil antenna 10B according to the second modification, many winding patterns are formed and distributed continuously along the entire inner periphery of the main wiring pattern 12 such that adjoining winding patterns 14a and 14b have opposite spiral directions: the left hand wind and the right hand wind, respectively. In this arrangement, when current flows, the lines of magnetic flux produced by the adjoining winding patterns 14a and 14b have opposite directions and negate each other. Thus, the effects of magnetic fields produced by the winding patterns 14a and 14b do not spread far away, so that the mutual inductance can be made small.

Second Embodiment

Figure 4:
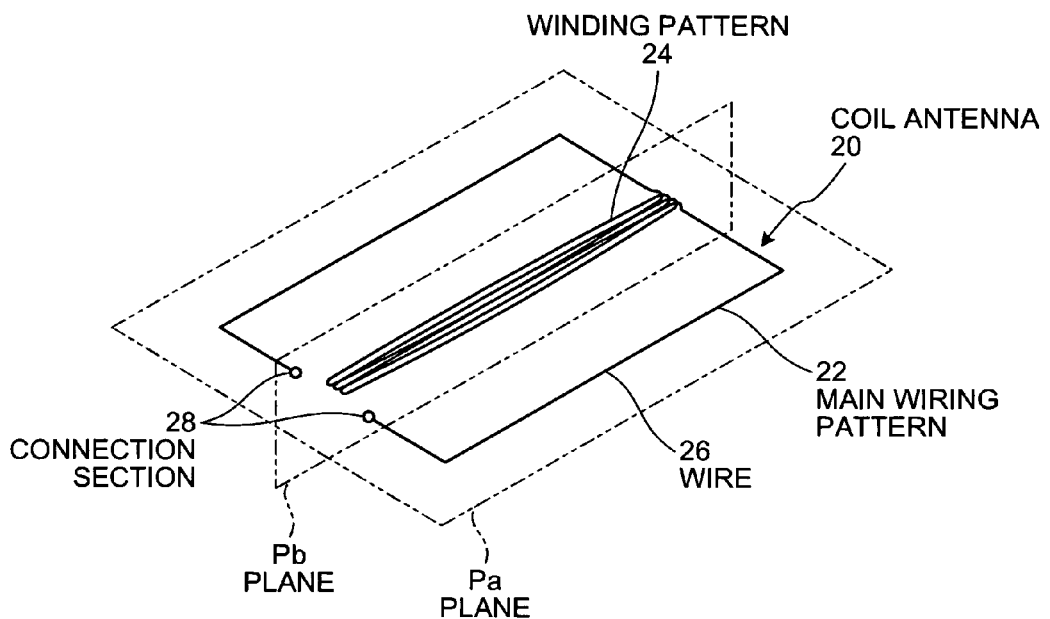
FIG. 4 is a schematic perspective view of a coil antenna according to a second embodiment of the present invention.

FIG. 4 is a schematic perspective view of a coil antenna 20 according to a second embodiment. As shown in FIG. 4, the coil antenna 20 according to the second embodiment includes a main wiring pattern 22 and a winding pattern 24, both formed with the same wire 26. The main wiring pattern 22 is arranged in a rectangular loop shape of a predetermined size, and has connection sections 28 at both ends thereof respectively that are electrically connected to, for example, a capacitor (not shown) forming a resonant circuit. The winding pattern 24 is formed, for example, in a spiral shape on a plane Pb orthogonal to a plane Pa on which the main wiring pattern 22 is arranged. The winding pattern 24 is formed to traverse a center portion of the main wiring pattern 22, and is thereby distributed to the entire main wiring pattern 22. The spiral wound shape of the winding pattern 24 has a length traversing the main wiring pattern 22 but is formed to be flat on the plane Pb, thus being small enough compared with the size of the main wiring pattern 22.

The self-inductance of the coil antenna 20 according to the second embodiment is a sum of a self-inductance of the main wiring pattern 22 and a self-inductance of the winding pattern 24. Thus, compared with a normal coil antenna including a main wiring pattern of the same shape and having equivalent self-inductance, the value of mutual inductance produced by placing coil antennas close to each other can be made sufficiently small, so that the effect of mutual interaction is significantly reduced. This is because the value of self-inductance the main wiring pattern 22 should have can be made small by a value accounting for the self-inductance of the winding pattern 24 and accordingly the mutual inductance due to the magnetic flux crossing the main wiring pattern 22 can be made small. In addition, the winding pattern 24 is formed on the plane Pb orthogonal to the main wiring pattern 22, and the magnetic flux crossing the main wiring pattern 22 does not cross the winding pattern 24. This enables the winding pattern 24 to have a relatively large shape (self-inductance), thereby allowing a small mutual inductance to be produced.

With this arrangement, the coil antenna 20 can be provided that has a small mutual inductance compared with a normal coil antenna having equivalent self-inductance. Even when placed close to each other, such coil antennas 20 have small mutual interaction, and therefore can avoid a large variation in communication characteristics that is caused by placing a plurality of coil antennas close to each other. Specifically, the self-inductance for determining a resonant frequency is ensured, while the mutual inductance is made small, thus realizing stable communication resistant to environmental fluctuations even with interfering matters. Further, the winding pattern 24 is formed to be flat and distributed so as to traverse the center portion of the main wiring pattern 22. This prevents that the thickness is increased locally as in chip coils.

In the second embodiment also, the self-inductance and the mutual inductance of the coil antenna 20 are relative values. Thus, a coil antenna can be provided that has a large self-inductance value compared with a normal coil antenna having equivalent mutual inductance.

Third Embodiment

Figure 5:
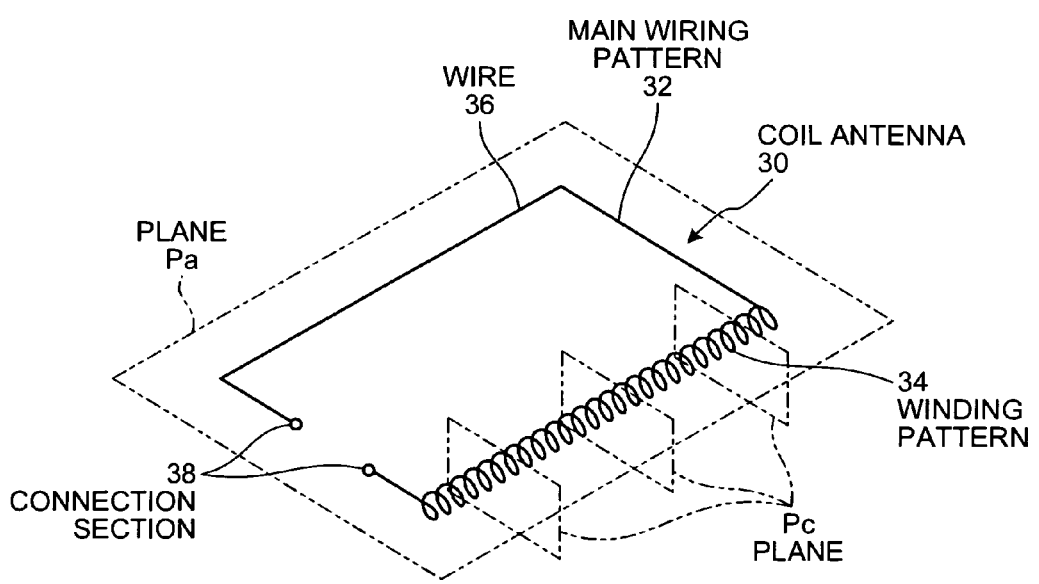
FIG. 5 is a schematic perspective view of a coil antenna according to a third embodiment of the present invention.

FIG. 5 is a schematic perspective view of a coil antenna 30 according to a third embodiment. As shown in FIG. 5, the coil antenna 30 according to the third embodiment includes a main wiring pattern 32 and a winding pattern 34, both formed with the same wire 36. The main wiring pattern 32 is arranged in a rectangular loop shape of a predetermined size, and has connection sections 38 at both ends thereof respectively that are electrically connected to, for example, a capacitor (not shown) forming a resonant circuit. The winding pattern 34 is formed, for example, in a spiral shape and distributed continuously along one side of the main wiring pattern 32. The winding pattern 34 is formed, for example, in a flat spiral shape over planes Pc orthogonal to one side of the plane Pa on which the main wiring pattern 32 is arranged. The spiral wound shape of the winding pattern 34 is formed to be small enough compared with the size of the main wiring pattern 32.

The self-inductance of the coil antenna 30 according to the third embodiment is a sum of a self-inductance of the main wiring pattern 32 and a self-inductance of the winding pattern 34. Thus, compared with a normal coil antenna including a main wiring pattern of the same shape and having equivalent self-inductance, the value of mutual inductance produced by placing coil antennas close to each other can be made sufficiently small, so that the effect of mutual interaction is significantly reduced. This is because the value of self-inductance the main wiring pattern 32 should have can be made small by a value accounting for the self-inductance of the winding pattern 34 and accordingly the mutual inductance due to the magnetic flux crossing the main wiring pattern 32 can be made small. In addition, the winding pattern 34 is formed over the planes Pc orthogonal to the main wiring pattern 32, and the magnetic flux crossing the main wiring pattern 32 does not cross the winding pattern 34. This enables a small mutual inductance to be produced.

With this arrangement, the coil antenna 30 can be provided that has a small mutual inductance compared with a normal coil antenna having equivalent self-inductance. Even when placed close to each other, such coil antennas 30 have small mutual interaction, and therefore can avoid a large variation in communication characteristics that is caused by placing a plurality of coil antennas close to each other. Specifically, the self-inductance for determining a resonant frequency is ensured, while the mutual inductance is made small, thus realizing stable communication resistant to environmental fluctuations even with interfering matters. Further, the winding pattern 34 is formed to be flat and distributed along the main wiring pattern 32. This prevents that the thickness is increased locally as in chip coils.

In the third embodiment also, the self-inductance and the mutual inductance of the coil antenna 30 are relative values. Thus, a coil antenna can be provided that has a large self-inductance value compared with a normal coil antenna having equivalent mutual inductance.

Fourth Embodiment

Figure 6:
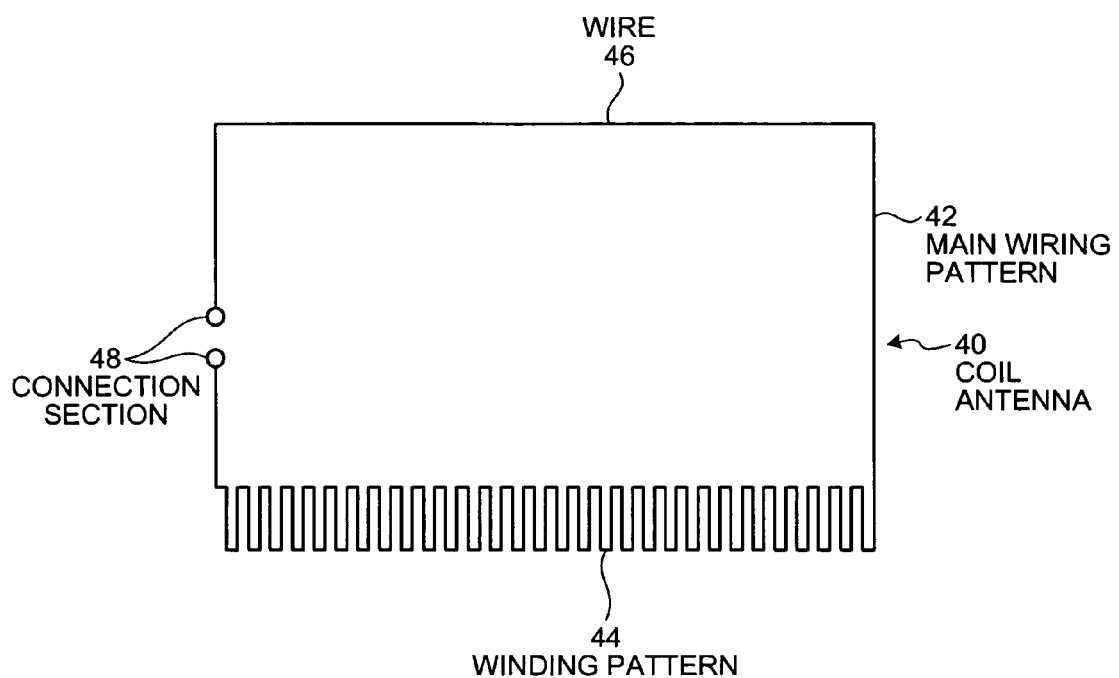
FIG. 6 is a schematic perspective view of a coil antenna according to a fourth embodiment of the present invention.

FIG. 6 is a schematic view of a coil antenna 40 according to a forth embodiment. As shown in FIG. 6, the coil antenna 40 according to the fourth embodiment includes a main wiring pattern 42 and a winding pattern 44, both formed with the same wire 46. The main wiring pattern 42 is arranged in a rectangular loop shape of a predetermined size, and has connection sections 48 at both ends thereof respectively that are electrically connected to, for example, a capacitor (not shown) forming a resonant circuit. The winding pattern 44 is formed, for example, in a zigzag shape such that its wound shape is distributed along one side of the main wiring pattern 42 and spread out on the same plane as the main wiring pattern 42. The planer wound shape constituted by the zigzag-shaped winding pattern 44 is formed at a small pitch so as to be small enough compared with the size of the main wiring pattern 42.

The self-inductance of the coil antenna 40 according to the fourth embodiment is a sum of a self-inductance of the main wiring pattern 42 and a self-inductance of the winding pattern 44. Thus, compared with a normal coil antenna including a main wiring pattern of the same shape and having equivalent self-inductance, the value of mutual inductance produced by placing coil antennas close to each other can be made sufficiently small, so that the effect of mutual interaction is significantly reduced. This is because the value of self-inductance the main wiring pattern 42 should have can be made small by a value accounting for the self-inductance of the winding pattern 44 and accordingly the mutual inductance due to the magnetic flux crossing the main wiring pattern 42 can be made small. In addition, the winding pattern 44 is formed in a zigzag shape at a small pitch along the main wiring pattern 42, so that the lines of magnetic flux, being strong near the winding pattern 44, negate each other as being away from the winding pattern 44. This enables a small mutual inductance to be produced in the winding pattern 44.

With this arrangement, the coil antenna 40 can be provided that has a small mutual inductance compared with a normal coil antenna having equivalent self-inductance. Even when placed close to each other, such coil antennas 40 have small mutual interaction, and therefore can avoid a large variation in communication characteristics that is caused by placing a plurality of coil antennas close to each other. Specifically, the self-inductance for determining a resonant frequency is ensured, while the mutual inductance is made small, thus realizing stable communication resistant to environmental fluctuations even with interfering matters. Further, the winding pattern 44 is formed to be flat along the main wiring pattern 42 on the same plane. This prevents that the thickness is increased locally.

In the fourth embodiment also, the self-inductance and the mutual inductance of the coil antenna 40 are relative values. Thus, a coil antenna can be provided that has a large self-inductance value compared with a normal coil antenna having equivalent mutual inductance. For example, when the winding pattern 44 of a zigzag shape having a 6-millimeter width is formed along one side of the main wiring pattern 42 of a 30-millimeter square shape, the self-inductance can be improved by about 80% compared with a coil antenna including only a main wiring pattern of a 30-millimeter square shape. This is equivalent to the self-inductance of a rectangular coil having a doubled or more than doubled area. Further, the ratio of the self-inductance to the mutual inductance can be varied by changing the width, the length, the pitch, or the like of the winding pattern 44 appropriately.

Fifth Embodiment

Figure 7:
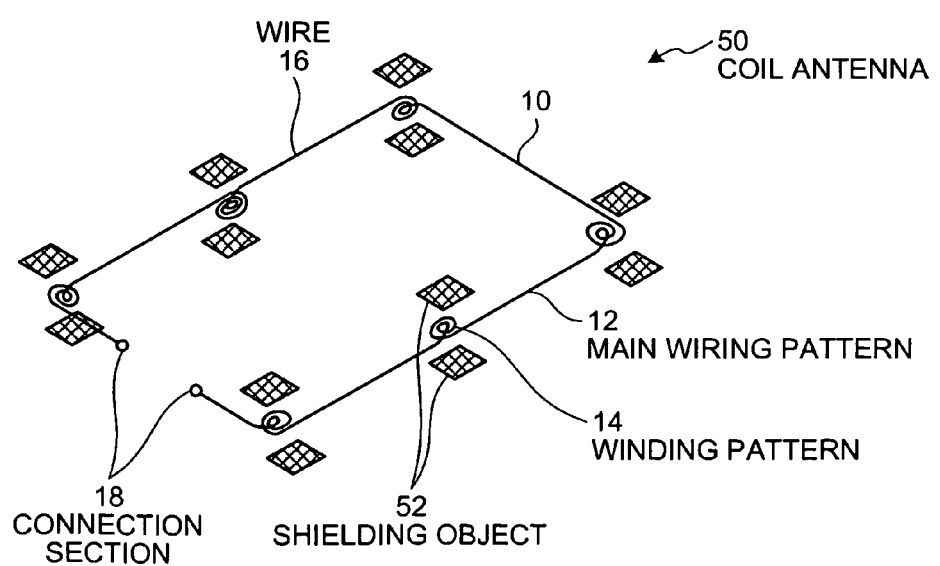
FIG. 7 is a schematic exploded perspective view of a coil antenna according to a fifth embodiment of the present invention.

FIG. 7 is a schematic exploded perspective view of a coil antenna 50 according to a fifth embodiment. As shown in FIG. 7, the coil antenna 50 according to the fifth embodiment includes, in addition to the components of the coil antenna 10 for example, shielding objects 52 provided to overlap on both surfaces (or one surface) near an area where each of the winding patterns 14 is formed. The shielding objects 52 are made of thin magnetic material.

The shielding objects 52 made of magnetic material that facilitates generation of magnetic flux are provided around the winding patterns 14 and shield them, so that the self-inductance of the winding patterns 14 is increased whereas the mutual inductance stays almost the same. This provides an advantage of making the ratio of the self-inductance to the mutual inductance further large, in addition to the advantages of the first embodiment. Further, the shielding objects 52 efficiently shield only a portion having a high current density in the area near each of the winding patterns 14, leaving the main wiring pattern 12 serving as an antenna to be mostly opened. This allows the magnetic flux to pass, thus causing no loss in the original communication characteristics.

Figure 8:
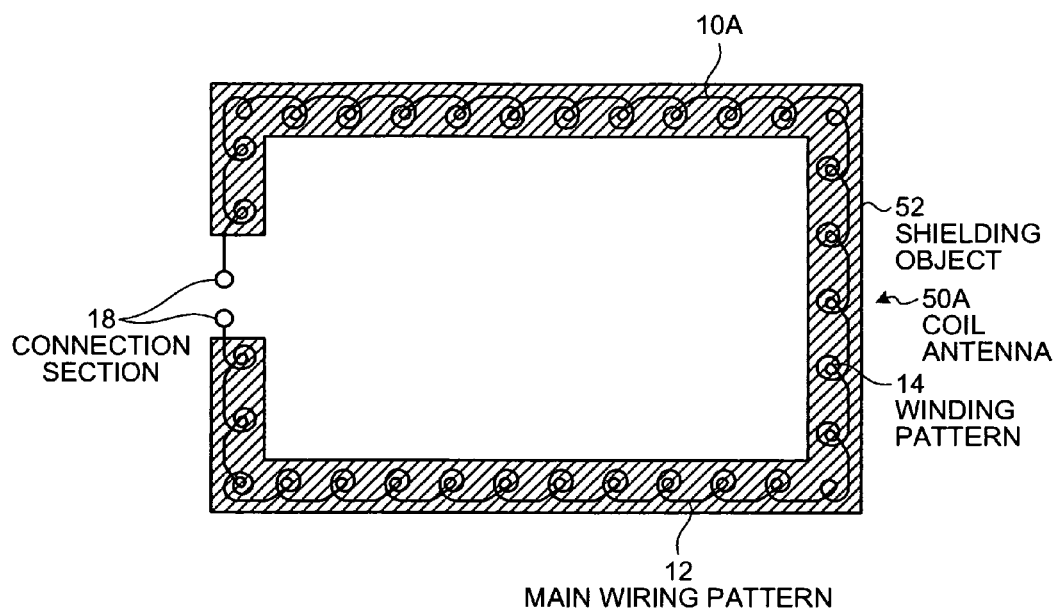
FIG. 8 is a schematic view of a coil antenna according to a modification of the fifth embodiment.
Figure 9:
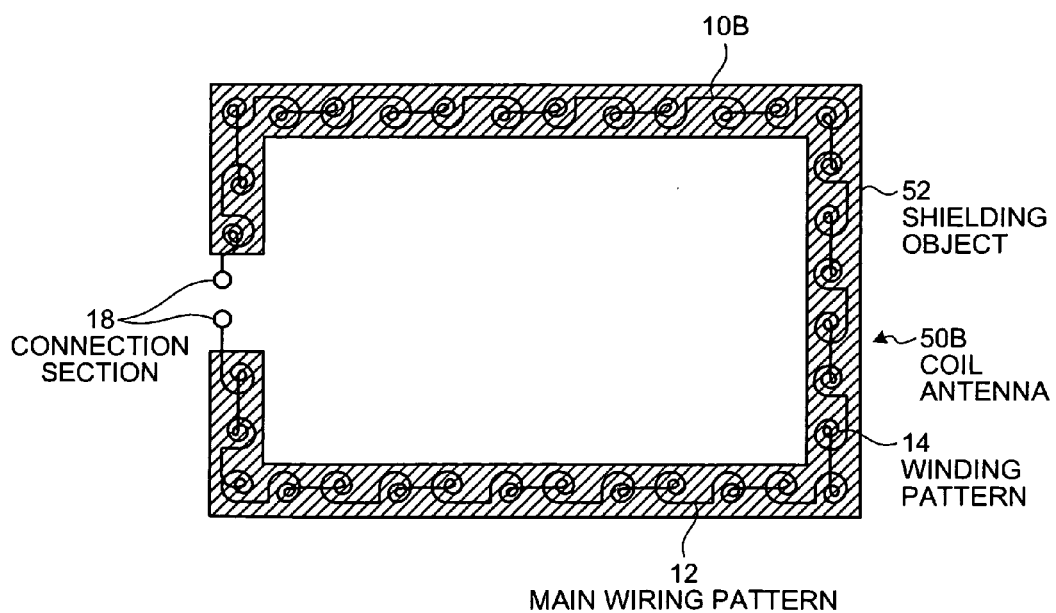
FIG. 9 is a perspective view of a coil antenna according to another modification of the fifth embodiment.
Figure 10:
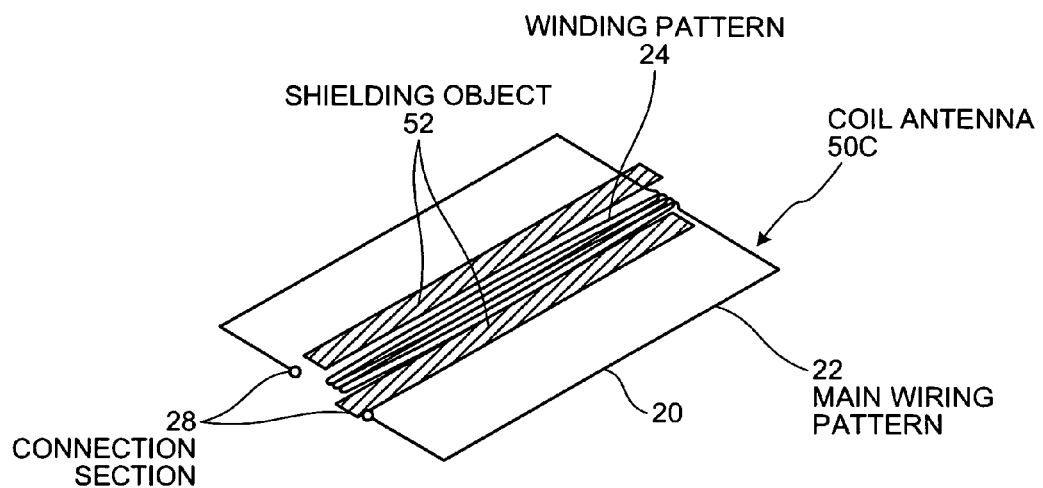
FIG. 10 is a schematic view of a coil antenna according to still another modification of the fifth embodiment.
Figure 11:
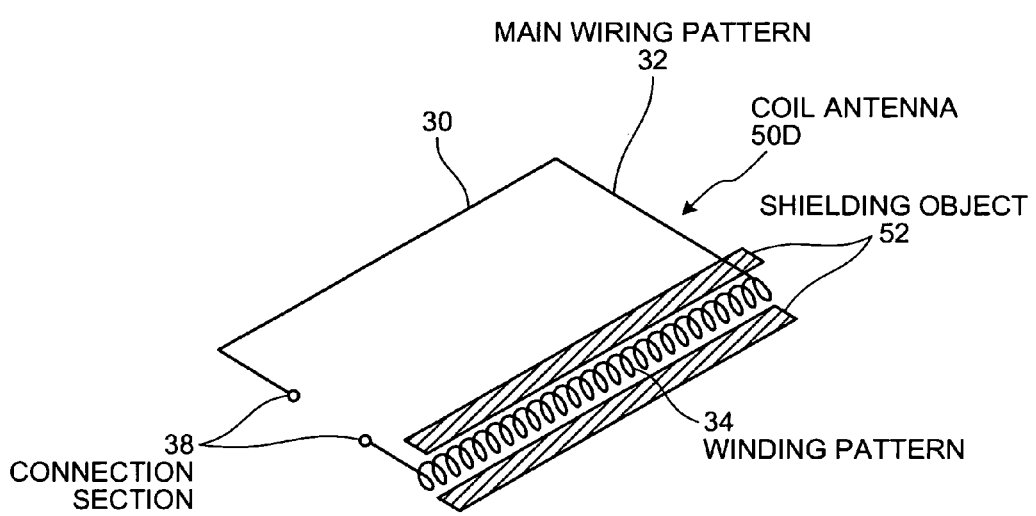
FIG. 11 is a schematic view of a coil antenna according to still another modification of the fifth embodiment.
Figure 12:
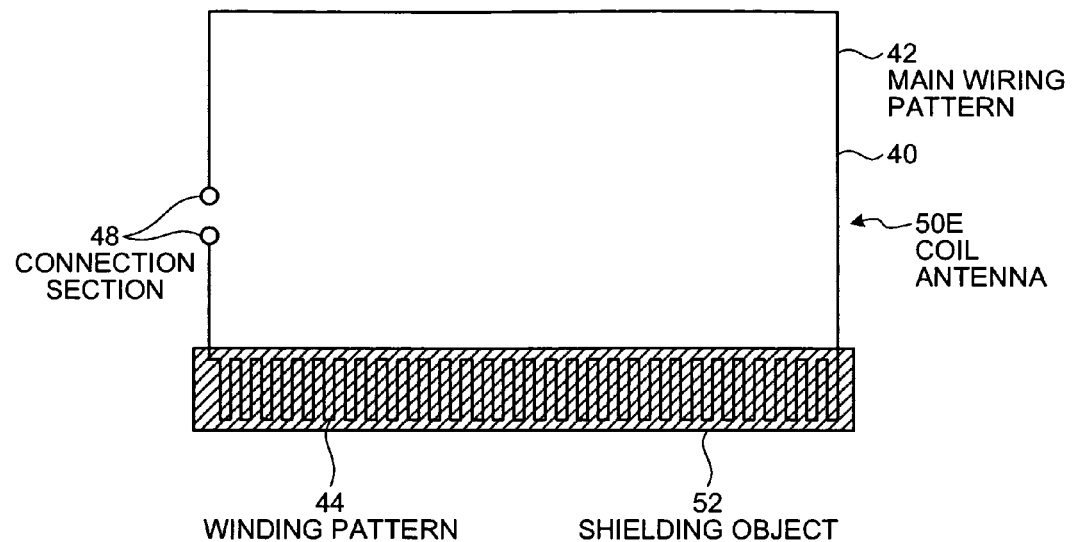
FIG. 12 is a schematic view of a coil antenna according to still another modification of the fifth embodiment.

The fifth embodiment is applicable not only to the coil antenna 10, but also to the coil antennas 10A, 10B, 20, 30, 40, and the like in the same manner. FIG. 8 is an exemplary view of a coil antenna 50A as an application to the coil antenna 10A, FIG. 9 is an exemplary view of a coil antenna 50B as an application to the coil antenna 10B, FIG. 10 is an exemplary view of a coil antenna 50C as an application to the coil antenna 20, FIG. 11 is an exemplary view of a coil antenna 50D as an application to the coil antenna 30, and FIG. 12 is an exemplary view of a coil antenna 50E as an application to the coil antenna 40.

Sixth Embodiment

Figure 13:
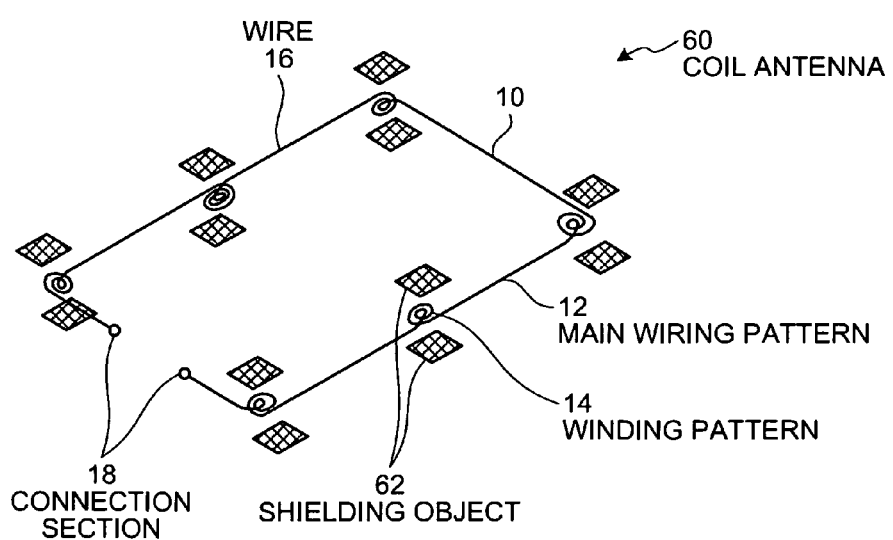
FIG. 13 is a schematic exploded perspective view of a coil antenna according to a sixth embodiment of the present invention.

FIG. 13 is a schematic exploded perspective view of a coil antenna 60 according to a sixth embodiment. As shown in FIG. 13, the coil antenna 60 according to the sixth embodiment includes, in addition to the components of the coil antenna 10 for example, shielding objects 62 provided to overlap on both surfaces (or one surface) near an area where each of the winding patterns 14 is formed. The shielding objects 62 are made of electrically conductive material such as thin metal.

The shielding objects 62 made of electrically conductive material such as metal are provided around the winding patterns 14 and shield them, so that the self-inductance of the winding patterns 14 is made small and the mutual inductance is made further small. This provides an advantage of making the ratio of the self-inductance to the mutual inductance comparatively large. Thus, in addition to the advantages of the first embodiment, the ratio of the self-inductance to the mutual inductance can be made further large. Further, the shielding objects 62 efficiently shield only a portion having a high current density in the area near each of the winding patterns 14, leaving the main wiring pattern 12 serving as an antenna to be mostly opened. This allows the magnetic flux to pass, thus causing no large loss in the original communication characteristics.

Figure 14:
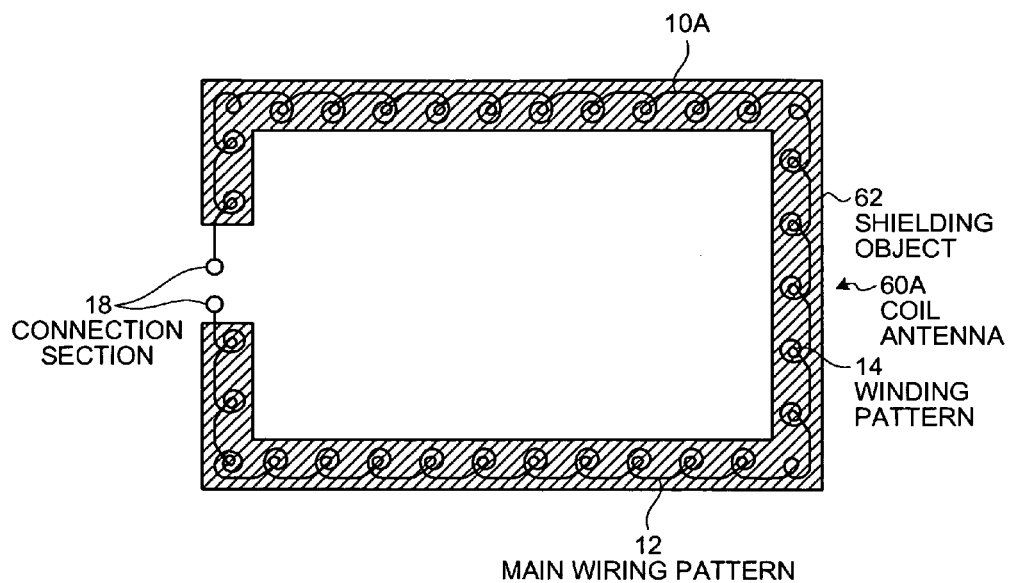
FIG. 14 is a schematic view of a coil antenna according to a modification of the sixth embodiment.
Figure 15:
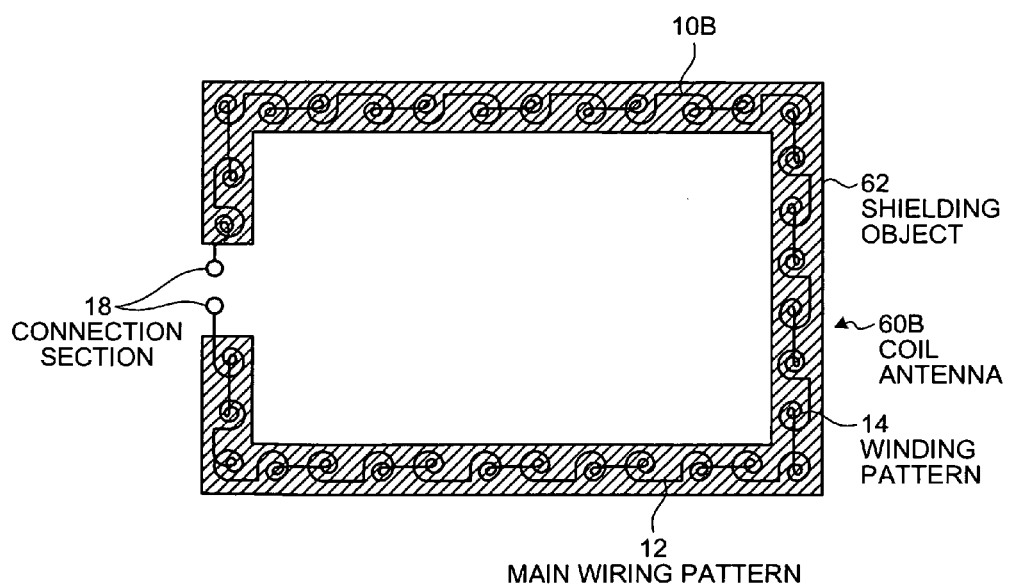
FIG. 15 is a schematic view of a coil antenna according to another modification of the sixth embodiment.
Figure 16:
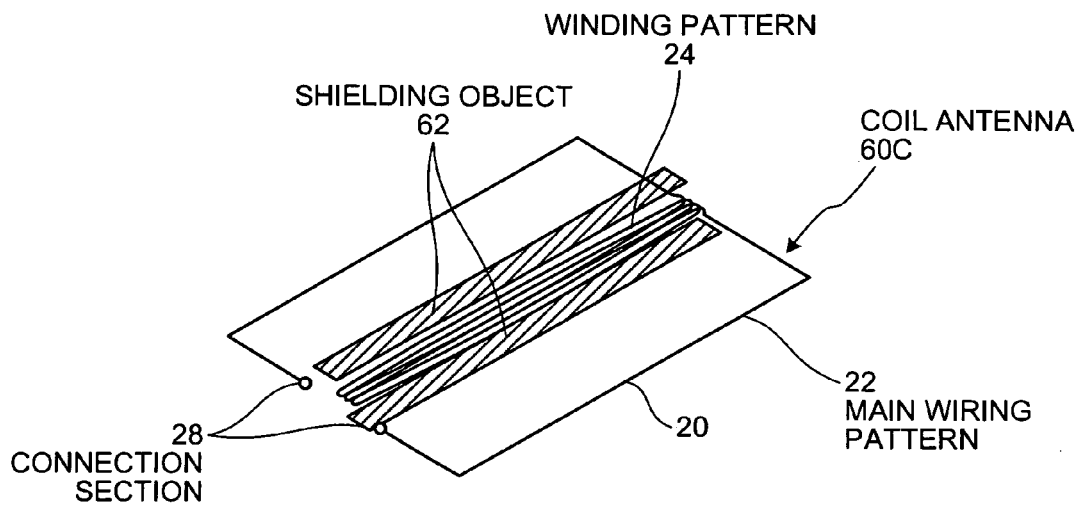
FIG. 16 is a schematic view of a coil antenna according to still another modification of the sixth embodiment.
Figure 17:
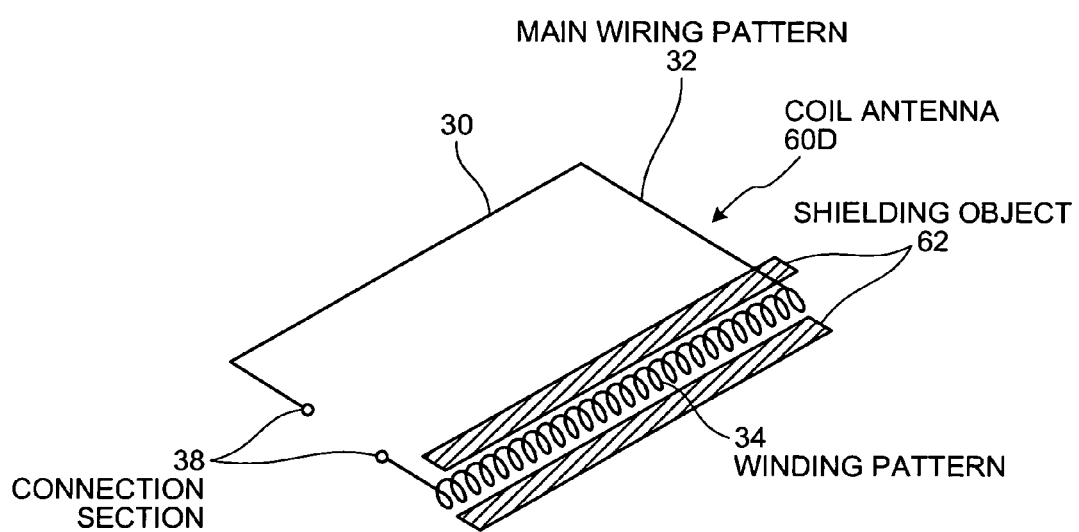
FIG. 17 is a schematic view of a coil antenna according to still another modification of the sixth embodiment.
Figure 18:
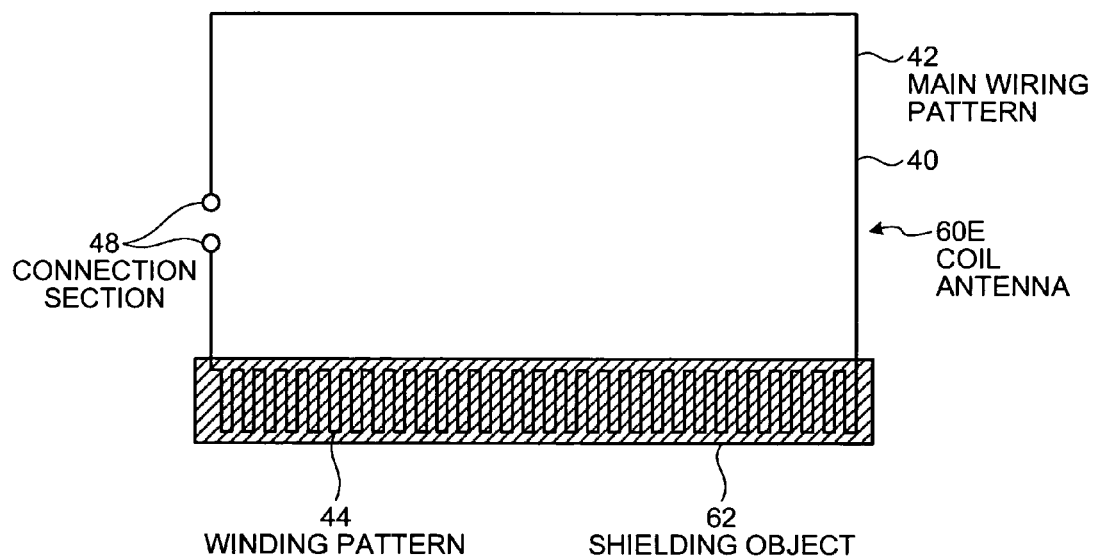
FIG. 18 is a schematic view of a coil antenna according to still another modification of the sixth embodiment.

The sixth embodiment is applicable not only to the coil antenna 10, but also to the coil antennas 10A, 10B, 20, 30, 40, and the like in the same manner. FIG. 14 is an exemplary view of a coil antenna 60A as an application to the coil antenna 10A, FIG. 15 is an exemplary view of a coil antenna 60B as an application to the coil antenna 10B, FIG. 16 is an exemplary view of a coil antenna 60C as an application to the coil antenna 20, FIG. 17 is an exemplary view of a coil antenna 60D as an application to the coil antenna 30, and FIG. 18 is an exemplary view of a coil antenna 60E as an application to the coil antenna 40.

Seventh Embodiment

Figure 19:
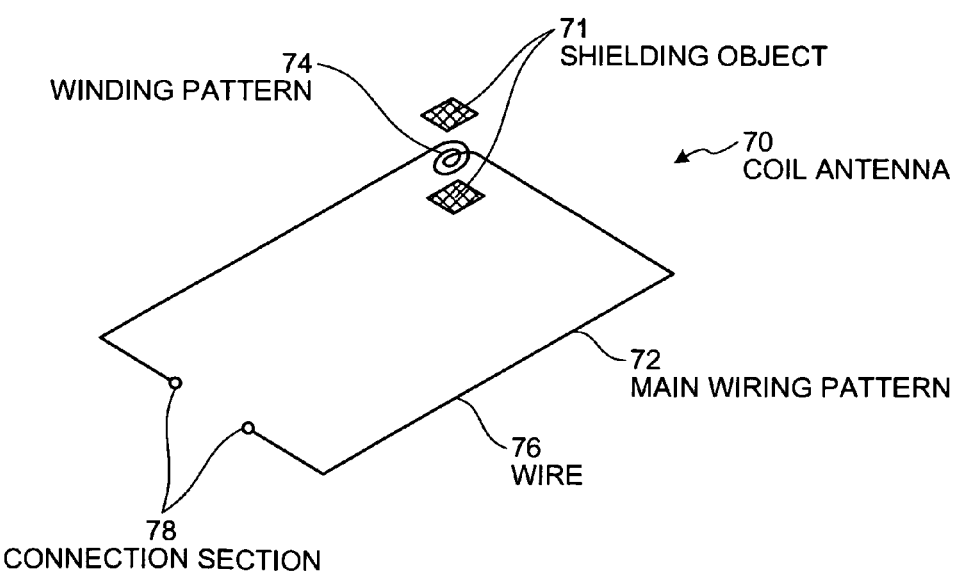
FIG. 19 is a schematic exploded perspective view of a coil antenna according to a seventh embodiment of the present invention.

FIG. 19 is a schematic exploded perspective view of a coil antenna 70 according to a seventh embodiment. As shown in FIG. 19, the coil antenna 70 according to the seventh embodiment includes a main wiring pattern 72 and a single winding pattern 74, both formed with the same wire 76. The main wiring pattern 72 is arranged in a rectangular loop shape of a predetermined size, and has connection sections 78 at both ends thereof respectively that are electrically connected to, for example, a capacitor (not shown) forming a resonant circuit. For example, on the same plane on which the main wiring pattern 72 is arranged, the winding pattern 74 is formed in a spiral shape at a portion of the main wiring pattern 72. The spiral wound shape of the winding pattern 74 is formed to be small enough compared with the size of the main wiring pattern 72. Further, the coil antenna 70 according to the seventh embodiment includes shielding objects 71 provided to overlap on both surfaces (or one surface) near an area where the winding pattern 74 is formed. The shielding objects 71 are made of thin magnetic material.

According to the seventh embodiment, the shielding objects 71 made of magnetic material that facilitates generation of magnetic flux are provided around the winding pattern 74 and shield it, so that the self-inductance of the winding pattern 74 is increased whereas the mutual inductance stays almost the same. Accordingly, the ratio of the self-inductance to the mutual inductance can be made large. Further, the shielding objects 71 efficiently shield only a portion having a high current density in the area near the winding pattern 74, leaving the main wiring pattern 72 serving as an antenna to be mostly opened. This allows the magnetic flux to pass, thus causing no large loss in the original communication characteristics.

With this arrangement, the coil antenna 70 can be provided that has a small mutual inductance compared with a normal coil antenna having equivalent self-inductance. Even when placed close to each other, such coil antennas 70 have small mutual interaction, and therefore can avoid a large variation in communication characteristics that is caused by placing a plurality of coil antennas close to each other. Specifically, the self-inductance for determining a resonant frequency is ensured, while the mutual inductance is made small, thus realizing stable communication resistant to environmental fluctuations even with interfering matters. Further, the winding pattern 74 is formed in a winding manner with the wire 76. This prevents that the thickness is increased locally as in chip coils.

Eighth Embodiment

Figure 20:
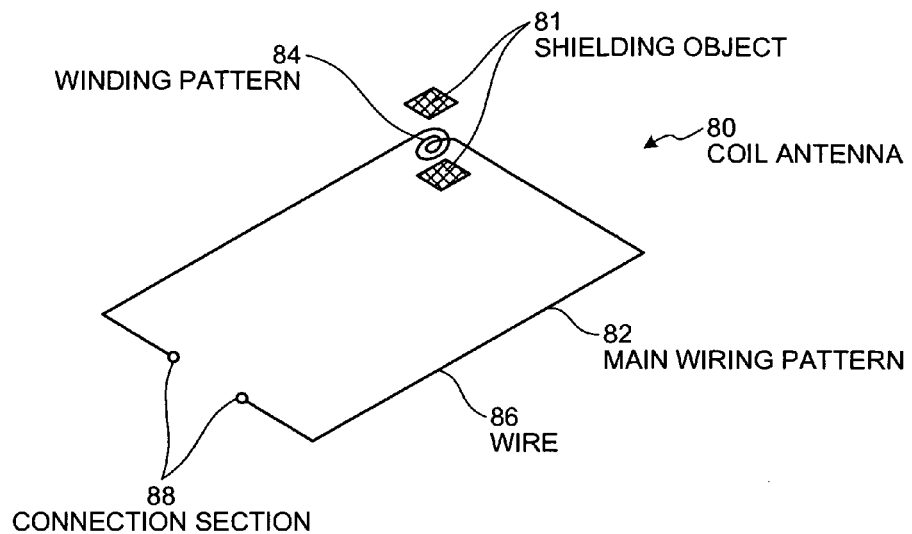
FIG. 20 is a schematic exploded perspective view of a coil antenna according to an eighth embodiment of the present invention.

FIG. 20 is a schematic exploded perspective view of a coil antenna 80 according to an eighth embodiment. As shown in FIG. 20, the coil antenna 80 according to the eighth embodiment includes a main wiring pattern 82 and a single winding pattern 84, both formed with the same wire 86. The main wiring pattern 82 is arranged in a rectangular loop shape of a predetermined size, and has connection sections 88 at both ends thereof respectively that are electrically connected to, for example, a capacitor (not shown) forming a resonant circuit. For example, on the same plane on which the main wiring pattern 82 is arranged, the winding pattern 84 is formed in a spiral shape at a portion of the main wiring pattern 82. The spiral wound shape of the winding pattern 84 is formed to be small enough compared with the size of the main wiring pattern 82. Further, the coil antenna 80 according to the eighth embodiment includes shielding objects 81 provided to overlap on both surfaces (or one surface) near an area where the winding pattern 84 is formed. The shielding objects 81 are made of electrically conductive material such as thin metal.

According to the eighth embodiment, the shielding objects 81 made of electrically conductive material, such as metal, is provided around the winding pattern 84 and shield it, so that the self-inductance of the winding pattern 84 is made small and the mutual inductance is made further small. Accordingly, the ratio of the self-inductance to the mutual inductance can be made comparatively large. Further, the shielding objects 81 efficiently shield only a portion having a high current density in the area near the winding pattern 84, leaving the main wiring pattern 82 serving as an antenna to be mostly opened. This allows the magnetic flux to pass, thus causing no large loss in the original communication characteristics.

With this arrangement, the coil antenna 80 can be provided that has a small mutual inductance compared with a normal coil antenna having equivalent self-inductance. Even when placed close to each other, such coil antennas 80 have small mutual interaction, and therefore can avoid a large variation in communication characteristics that is caused by placing a plurality of coil antennas close to each other. Specifically, the self-inductance for determining a resonant frequency is ensured, while the mutual inductance is made small, thus realizing stable communication resistant to environmental fluctuations even with interfering matters. Further, the winding pattern 84 is formed in a winding manner with the wire 86. This prevents that the thickness is increased locally as in chip coils.

Ninth Embodiment

Figure 21:
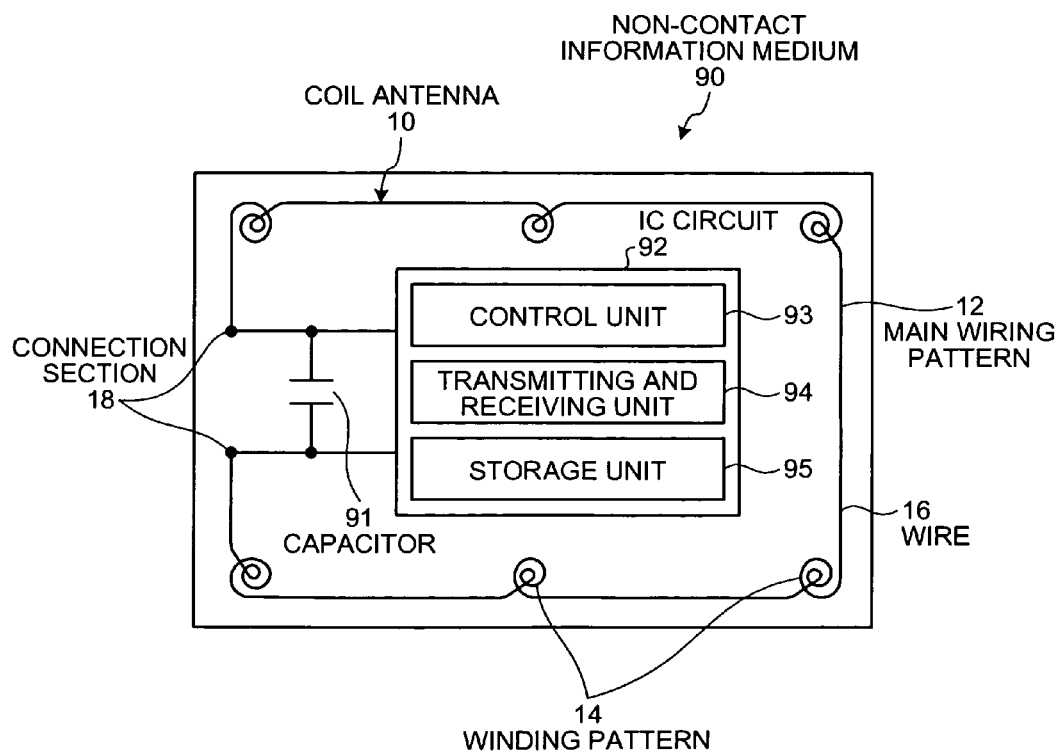
FIG. 21 is a schematic view of a non-contact information medium according to a ninth embodiment of the present invention.

FIG. 21 is a schematic view of a non-contact information medium 90 according to a ninth embodiment. As shown in FIG. 21, the non-contact information medium 90 according to the ninth embodiment includes the coil antenna 10 of the first embodiment for example, a capacitor 91, and an IC circuit 92 configured as a chip. The coil antenna 10 and the capacitor 91 are electrically connected at the connection sections 18.

The non-contact information medium 90 is, for example, a card type, and the coil antenna 10 is provided outside and around the IC circuit 92. The capacitor 91 has a predetermined capacitance, serves to store energy therein, and forms a resonant circuit with the coil antenna 10. The resonant frequency of the resonant circuit is adjusted (tuned) to the frequency of an electric wave transmitted from a reader/writer. With this arrangement, when the non-contact information medium 90 is brought near the reader/writer emitting an electric wave of a certain frequency, the resonant circuit resonates, thus causing induced current in the resonant circuit. The resonant circuit supplies this induced current to the IC circuit 92.

The coil antenna 10 has an antenna section that is formed for receiving an electric wave transmitted from the reader writer and outputting it to the IC circuit 92, and for transmitting to the reader/writer a signal output from the IC circuit 92.

The IC circuit 92 includes a control unit 93, a transmitting and receiving unit 94, and a storage unit 95, and controls information to be transmitted and received by the non-contact information medium 90. The control unit 93 controls processing operations to be performed by the transmitting and receiving unit 94 and the storage unit 95. The transmitting and receiving unit 94 processes an electric wave transmitted from the reader/writer and received by the coil antenna 10, extracts from the storage unit 95 information requested by the reader/writer, and transmits a signal corresponding to the extracted information to the coil antenna 10. The storage unit 95 stores therein various kinds of information including identification information for identifying each non-contact information medium 90. The IC circuit 92 is supplied with induced current from the resonant circuit including the coil antenna 10 and the capacitor 91, and starts operation when a voltage value corresponding to this induced current reaches a voltage value enabling the IC circuit 92 to operate.

Figure 22:
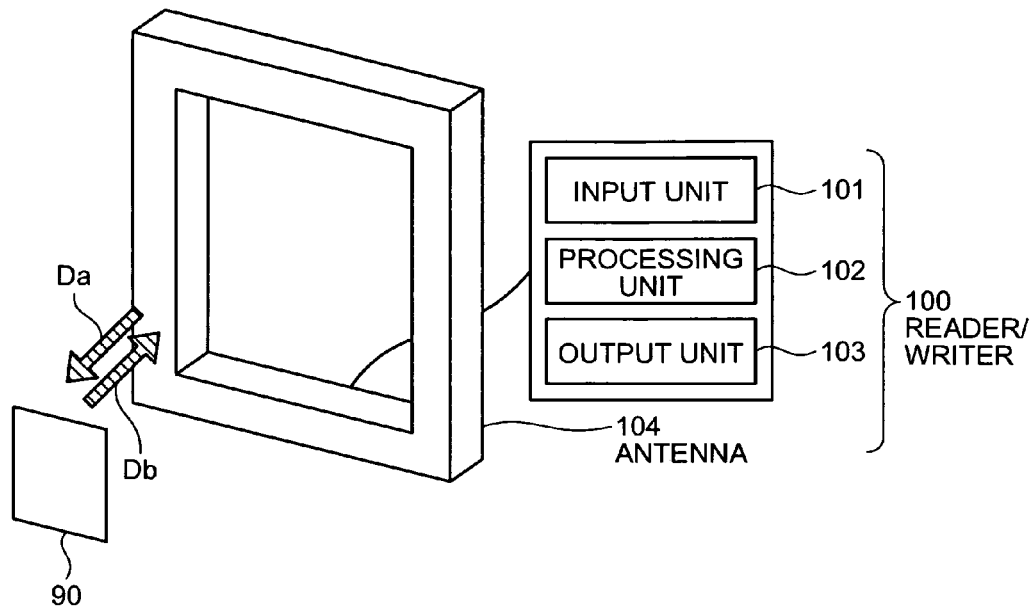
FIG. 22 is a schematic perspective view of a communication system with a single non-contact information medium.

With reference to FIG. 22, the following describes a communication system using the non-contact information medium 90 according to the seventh embodiment. As shown in FIG. 22, a reader/writer 100 transmitting and receiving information to and from the non-contact information medium 90 includes: an input unit 101 that inputs instruction information for instructing processing operation to be performed by the reader/writer 100; a processing unit 102 that processes information to be transmitted and received; an output unit 103 that outputs transmitted and received information; and an antenna 104 that supplies electric power and transmits and receives information through an electric wave of a certain frequency. Such a communication system using the reader/writer 100 and the non-contact information medium 90 is capable of receiving information from a plurality of non-contact information media at one time, as long as an anti-collision function is provided on both ends.

In the non-contact information medium 90, the resonant frequency of the resonant circuit, constituted by the coil antenna 10 and the capacitor 91, is adjusted (tuned) to the frequency of an electric wave emitted from the reader/writer 100. Thus, as shown in FIG. 22, when the single non-contact information medium 90 receives an electric wave transmitted from the antenna 104, the induced current flows in the resonant circuit. Accordingly, the IC circuit 92 is activated, and the non-contact information medium 90 transmits response information Db in response to response request information Da transmitted from the reader/writer. As such, when the non-contact information medium 90 is provided as a single piece, the wireless communication is accurately performed between the non-contact information medium 90 and the reader/writer 100.

The following considers an arrangement that a plurality of non-contact information media 90 is placed close to each other to overlap. When a plurality of non-contact information media each having a coil antenna is placed close to each other and if large mutual interference occurs not only between the non-contact information media and the reader/writer but also between the coil antennas of the non-contact information media, the resonant frequency of the resonant circuit varies being affected by the interference. This leads to unstable communication or disables the communication.

Figure 23:
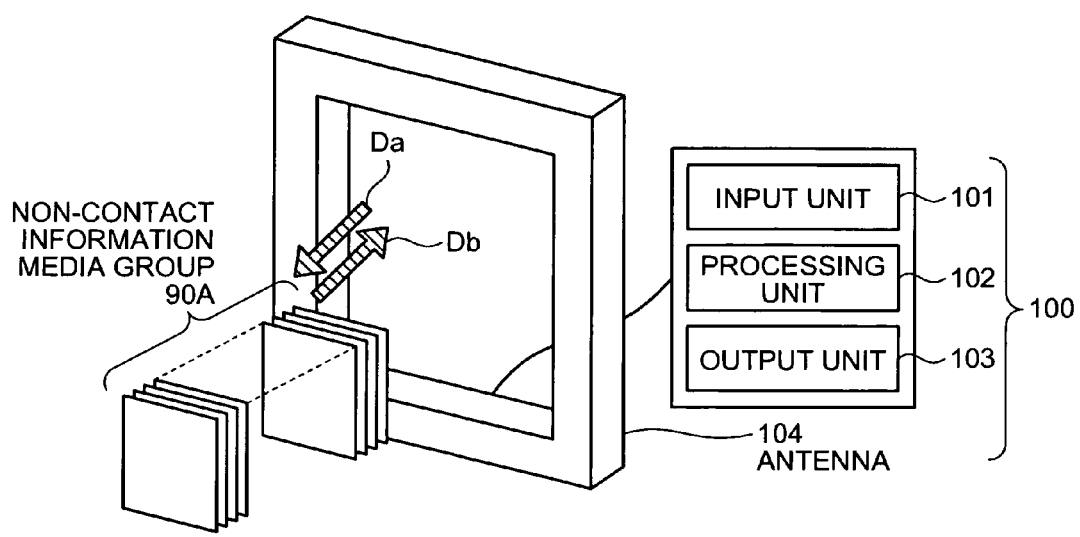
FIG. 23 is a schematic perspective view of a communication system with a plurality of non-contact information media.

Each of the non-contact information media 90 according to the ninth embodiment uses the coil antenna 10, described in the first embodiment, as a coil element constituting the resonant circuit. This enables the non-contact information media to have small mutual interaction. Thus, even when the non-contact information media 90 are overlapped, the mutual interference between the coil antennas 10 can be made small compared with the conventional non-contact information media. This prevents the variation in resonant frequency of the resonant circuit in each of the non-contact information media 90. Accordingly, each of the non-contact information media 90 can accurately communicate with the reader/writer 100. For example, as to a non-contact information media group 90A shown in FIG. 23, even when the non-contact information media 90 are placed to overlap with no space in between, each of the non-contact information media 90 can transmit the response information Db in response to the response request information Da from the reader/writer 100, and therefore can accurately perform wireless communication with the reader/writer 100.

According to the ninth embodiment, it is possible to place a significantly increased number of the non-contact information media 90 simultaneously near the reader/writer 100. By conducting experiments, the present inventors confirmed that when about 50 media were placed to overlap, each medium was able to perform communication. Further, to make the mutual inductance comparatively small, no component was used, such as a chip coil causing a locally increased thickness, thus achieving a thin figure of the coil antenna 10 itself. For example, as to an inlay serving as a base material for the non-contact information medium 90 of card type, the thickness was reduced to about 0.25 millimeter from the thickness of a conventional material of about 0.5 millimeter (the IC circuit 92 configured as a chip currently has a thickness of about 0.15 millimeter). By realizing a thin inlay as such, the non-contact information medium 90 to be commercialized is realized as a flexible card just like a label. Further, a fragile and expensive chip coil, made of ceramic material for example, is not used and the entire coil antenna 10 is formed with one wire 16. This provides a low-cost and break-proof coil antenna, and enables its stable operation, also being effective for realizing stability in its quality.

The ninth embodiment describes an example that the non-contact information medium 90 uses the coil antenna 10. Other than the coil antenna 10, any of the coil antennas 10A, 10B, 20, 30, 40, 50, 50A to 50E, 60, 60A to 60E, 70, and 80 may be used for the configuration. By conducting experiments, the present inventors confirmed that a significantly increased number of readable non-contact information media were stacked, up to about 50, and that the thickness of each non-contact information medium (including an inlay) was reduced to about 0.25 millimeter. It was also confirmed that, as to non-contact information media each using the coil antenna 50 with the shielding objects 52, a significantly increased number of the non-contact information media were stacked, up to about 50, and that the thickness of each non-contact information medium (including an inlay) was reduced to about 0.30 millimeter, which was slightly larger due to the shielding objects.

INDUSTRIAL APPLICABILITY

As described, a coil antenna and a non-contact information medium according to the present invention are useful for providing and receiving information using electromagnetic induction, and particularly suitable for wireless communication with a reader/writer.

The invention claimed is:

1. A non-contact information medium comprising:
a base;
a coil antenna formed with a wire arranged in a loop shape on the base and forming a resonant circuit with a capacitor electrically connected thereto, the coil antenna comprising a winding pattern that is distributed to a portion of or an entire main wiring pattern forming the loop, and that is formed with the wire to have a wound shape smaller than the main wiring pattern; and
an IC circuit disposed on the base and connected to the resonant circuit to transmit and receive information to and from a reader/writer.

2. The non-contact information medium according to claim 1, wherein the wound shape of the winding pattern is a spiral shape.

3. The non-contact information medium according to claim 2, wherein the winding pattern is formed on same plane as the main wiring pattern so as to be distributed to a plurality of locations in the main wiring pattern.

4. A coil antenna, formed with a wire arranged in a loop shape and forming a resonant circuit with a capacitor electrically connected thereto, the coil antenna comprising:
a winding pattern that is distributed to a portion of or an entire main wiring pattern forming the loop, and that is formed with the wire to have a wound shape smaller than the main wiring pattern,
wherein the wound shape of the winding pattern is a spiral shape,
the winding pattern is formed on same plane as the main wiring pattern so as to be distributed to a plurality of locations in the main wiring pattern, and
the winding pattern is formed continuously along the main wiring pattern so as to have the spiral shape having a turning direction opposite a turning direction of an adjoining spiral shape.

5. The coil antenna according to claim 4 further comprising:
an IC circuit that is connected to the resonant circuit, and transmits and receives information to and from a reader/writer.

6. A coil antenna, formed with a wire arranged in a loop shape and forming a resonant circuit with a capacitor electrically connected thereto, the coil antenna comprising:
a winding pattern that is distributed to a portion of or an entire main wiring pattern forming the loop, and that is formed with the wire to have a wound shape smaller than the main wiring pattern,
wherein the wound shape of the winding pattern is a spiral shape, and
the winding pattern is formed on a plane orthogonal to a plane on which the main wiring pattern is formed.

7. The coil antenna according to claim 6, wherein the winding pattern is formed and distributed so as to traverse a portion of the main wiring pattern.

8. The coil antenna according to claim 6, wherein the winding pattern is formed and distributed along at least a portion of the main wiring pattern.

9. The coil antenna according to claim 6 further comprising:
an IC circuit that is connected to the resonant circuit, and transmits and receives information to and from a reader/writer.

10. A coil antenna, formed with a wire arranged in a loop shape and forming a resonant circuit with a capacitor electrically connected thereto, the coil antenna comprising:
a winding pattern that is distributed to a portion of or an entire main wiring pattern forming the loop, and that is formed with the wire to have a wound shape smaller than the main wiring pattern,
wherein the wound shape of the winding pattern is a zigzag shape formed such that a winding shape thereof is distributed along at least a portion of the main wiring pattern and spread out on same plane as the main wiring pattern.

11. The coil antenna according to claim 10 further comprising:
an IC circuit that is connected to the resonant circuit, and transmits and receives information to and from a reader/writer.

12. A coil antenna, formed with a wire arranged in a loop shape and forming a resonant circuit with a capacitor electrically connected thereto, the coil antenna comprising:
a winding pattern that is distributed to a portion of or an entire main wiring pattern forming the loop, and that is formed with the wire to have a wound shape smaller than the main wiring pattern; and
a shielding object provided to overlap on one surface or both surfaces near an area where the winding pattern is formed.

13. The coil antenna according to claim 12, wherein the shielding objects are made of magnetic material.

14. The coil antenna according to claim 12, wherein the shielding objects are made of electrically conductive material.

15. The coil antenna according to claim 12 further comprising:
an IC circuit that is connected to the resonant circuit, and transmits and receives information to and from a reader/writer.

16. A coil antenna, formed with a wire arranged in a loop shape and forming a resonant circuit with a capacitor electrically connected thereto, the coil antenna comprising:
a winding pattern that is formed, in a portion of a main wiring pattern forming the loop, with the wire to have a wound shape smaller than the main wiring pattern; and
a shielding object provided to overlap on one surface or both surfaces near an area where the winding pattern is formed.

17. The coil antenna according to claim 16, wherein the shielding objects are made of magnetic material.

18. The coil antenna according to claim 16, wherein the shielding objects are made of electrically conductive material.

19. The coil antenna according to claim 16 further comprising:
an IC circuit that is connected to the resonant circuit, and transmits and receives information to and from a reader/writer.

* * * * *